United States Patent [19]

Regunathan et al.

[11] Patent Number: 4,770,770
[45] Date of Patent: Sep. 13, 1988

[54] WATER SUPPLY SYSTEM USING REVERSE OSMOSIS UNIT FOR TREATMENT OF WATER SUPPLY

[75] Inventors: Perialwar Regunathan, Wheaton; Dale A. Squier, Oswego; John W. Tadlock, West Chicago, all of Ill.

[73] Assignee: Everpure, Inc., Westmont, Ill.

[21] Appl. No.: 101,503

[22] Filed: Sep. 28, 1987

[51] Int. Cl.[4] .............................................. B01D 13/00
[52] U.S. Cl. .................................... 210/102; 210/103; 210/181; 210/257.2; 210/321.66
[58] Field of Search .................... 210/175, 181, 321.66, 210/257.2, 102, 103

[56] References Cited

U.S. PATENT DOCUMENTS

| | | | |
|---|---|---|---|
| 1,825,631 | 9/1931 | Horvath | 210/257.2 |
| 3,629,075 | 12/1971 | Gutbier | 210/321.66 |
| 3,786,924 | 1/1974 | Huffman | 210/257.2 |
| 4,410,429 | 10/1983 | Harvey et al. | 210/321.66 |

Primary Examiner—Frank Spear
Assistant Examiner—Richard D. Jordan
Attorney, Agent, or Firm—Frank R. Thienpont

[57] ABSTRACT

A water supply system for use in connection with a variety of water using equipment such, for example, as commercial ice makers and commercial steam cooking equipment wherein the water supply system utilizes a reverse osmosis unit thereby providing water of low mineral content to be used as product water in the equipment and at the same time utilizing the waste water generated from use of the reverse osmosis unit to provide cooling or condensing water for the same units to which the low mineral water is supplied.

12 Claims, 2 Drawing Sheets

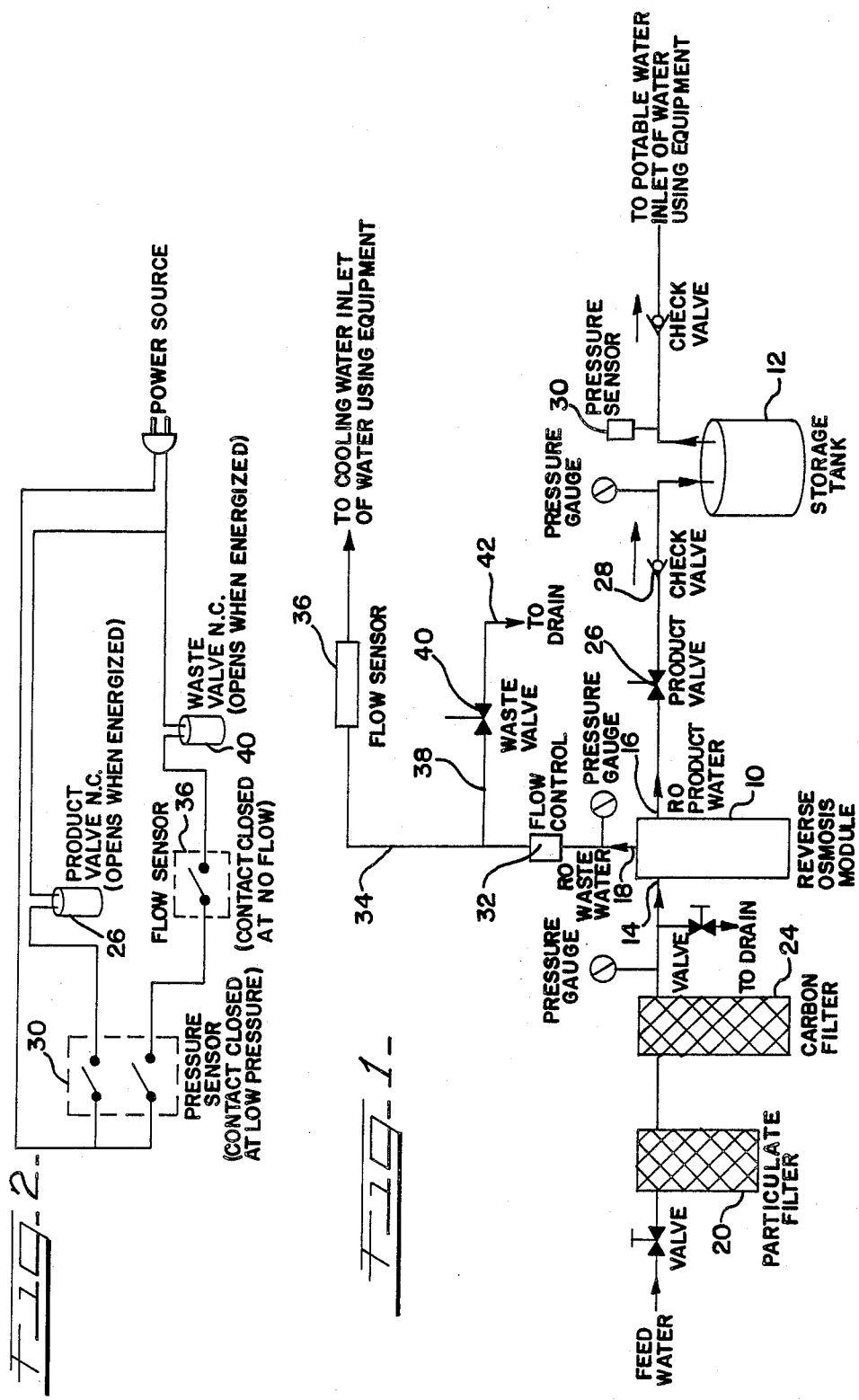

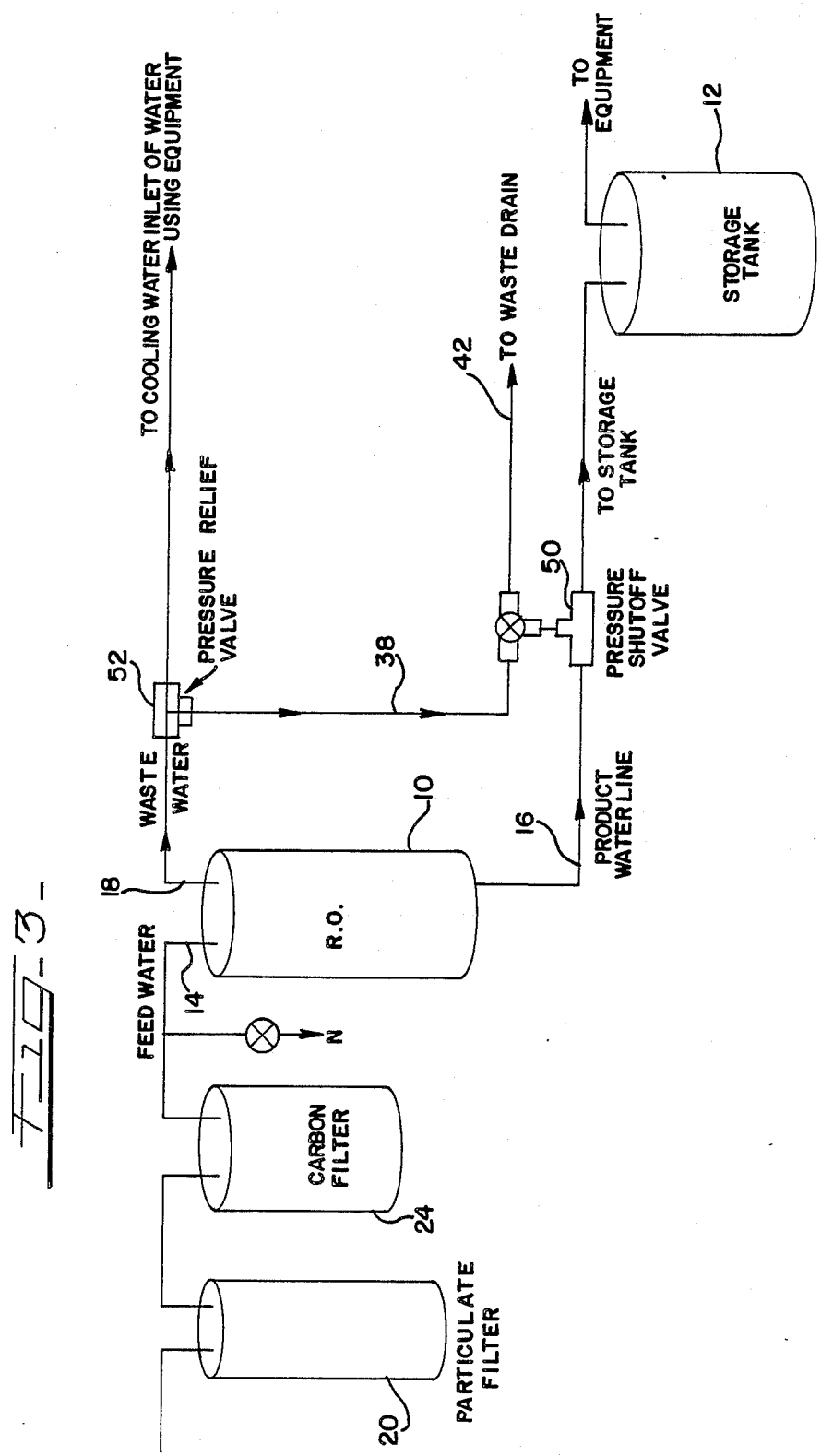

WATER SUPPLY SYSTEM USING REVERSE OSMOSIS UNIT FOR TREATMENT OF WATER SUPPLY

BACKGROUND OF THE INVENTION

This invention relates to a water treatment system and particularly to one utilizing a reverse osmosis unit from which both the low mineral product water and the waste water are used by the associated water using equipment.

Commercial ice makers are susceptible to breakdown due to the accumulation of lime scale and other precipitates which may form from the minerals found in the water used to make the ice. The water used to make the ice usually is allowed to flow into a reservoir, from which it is recirculated over a freezing plate and back to the reservoir. This process encourages the rinsing away of dissolved minerals and other impurities from the growing mass of crystalline ice and back into the reservoir where the concentration of minerals increases. Some of this concentrated water is conserved for the next successive ice making cycle, resulting in a continual compounding of the concentrating effect of the process from cycle to cycle. Usually a good portion of the concentrate is flushed or dumped from the ice machine after each cycle to help slow the compounding of the concentrating effect in an attempt to extend the time between ice machine cleanings. This leads to inefficiency, since the water dumped has already been chilled to near freezing temperature, and the new make-up water let in to replace the dumped water has not been chilled. Eliminating or reducing the amount of the dump would make the ice machine operate more efficiently.

Commercial steam cookers are also similarly susceptible to such scale formation and equipment breakdown. Water entering the boiler is turned to steam, which enters the cooking chamber, leaving the minerals from the water behind to concentrate in the boiler. Heating of the water to above its boiling point leaves behind the dissolved minerals to precipitate as scale or sludge leading to machine breakdown and/or increased maintenance.

Many ice makers are water-cooled. The water used for this purpose removes heat from the refrigerant and allows the refrigerant to condense from a gas back to a liquid for repeated use in the machine. The water used as cooling water is usually tap water and goes down the drain after passing through the condenser of the ice machine.

Steam cookers also use water for cooling. The cooking chamber has an outlet to allow the condensed steam to drain out of the chamber. The drain pipe also includes a spray condenser, which condenses any steam escaping the chamber. Plumbing codes forbid sending steam or very hot water into the sewer pipes, so cold water is sprayed into the drain pipe to condense the steam and to lower the temperature of the water to be drained. The water used as condensing water is usually tap water.

The use of water low in mineral content in both ice makers and to generate steam in steam cookers would greatly reduce scale formation and extend the time between maintenance calls resulting from scale build-up. Also the ice machine dump could be reduced or eliminated with the use of water of low mineral content.

Osmosis is the passage of liquid through a semipermeable membrane. A semi-permeable membrane is a membrane which allows one component of a solution to pass through it and not the others. In osmosis, there is a tendency for liquid to go from an area of less concentration to an area of more concentration through a semipermeable membrane. If a pressure is applied to the concentrated solution, reverse osmosis will take place. The pressure causes a flow through the membrane into the diluted solution. When this process is applied to water, the product water that has gone through the membrane has a reduced mineral, or total dissolved solids (T.D.S.), content as a result of the passage of water molecules through the membrane while the mineral ions are rejected and stay behind. The minerals left behind are concurrently washed out by a flow of water termed as waste water or reject water, so that the process of reverse osmosis can continue without the membrane surfaces being scaled over by the mineral build up. This waste water is a major portion of the water that enters the reverse osmosis unit and is directed to the drain.

Because of the desirablility of using water of as low a mineral content as possible in various types of water using equipment such as ice makers and steam cookers it has become desirable to develop a water supply system using the reverse osmosis process and a reverse osmosis unit as a part thereof. In such a system it then also becomes possible to use the waste water generated from the reverse osmosis process as cooling or condensing water for the same units of equipment to which the low mineral water is supplied. Thus, multiple uses of the water supply can be achieved.

SUMMARY OF THE INVENTION

A principal object of the invention is to provide a water treatment system utilizing the reverse osmosis process and a reverse osmosis unit whereby both the low mineral product water and the waste water may be used in the water using equipment.

Another object of the invention is to provide a water treatment system including a reverse osmosis module whereby a single source of water may be used to provide both purified product water and cooling water for the equipment utilizing the treated water.

Another object is to provide a water treatment system for use in connection with a steam cooker device including a reverse osmosis module whereby a single source of water may be used to provide both purified product water to provide the steam for a steam cooker and condensing water to condense the steam in the cooker.

Another object is to provide a water treatment system for use in connection with a water-cooled ice maker including a reverse osmosis module whereby a single source of water may be used both to provide the product water which is to be made into ice and to provide cooling water for removing heat from the refrigerant.

Another object is to provide a water treatment system including a reverse osmosis unit for use in connection with a water cooled ice-maker to permit the use of reverse osmosis waste water as cooling water for the equipment.

Another object is to provide a water treatment system including a reverse osmosis unit for use in connection with steam cooker equipment to permit the use of the reverse osmosis waste water as condensing water for the equipment.

The above objects and advantages will become more apparent when considered in conjunction with the accompanying drawings and the following description.

BRIEF DESCRIPTION OF THE DRAWINGS

FIG. 1 is a schematic diagram of a water supply system illustrating the flow of water to a unit of water using equipment and utilizing a reverse osmosis module to provide both low mineral product water and waste water to be used by the equipment.

FIG. 2 is an electrical schematic diagram of the type that can be used with the water supply system of FIG. 1 if the controlling means are electrically operated.

FIG. 3 is a schematic diagram of a water supply system illustrating the flow of water to a unit of water using equipment similar to that shown in FIG. 1 but utilizing a hydraulic operating system.

DESCRIPTION OF PREFERRED EMBODIMENT

The water supply system described herein includes generally a reverse osmosis unit 10 adapted to be connected to a feed water source and a storage tank 12 for receiving purified or processed product water that slowly seeps through the membrane from the reverse osmosis unit and storing same to be available on demand by the equipment using processed water. The storage tank is a commercially available pressurized tank with a bladder. The tank is air charged around the bladder on the outside, and the product water is introduced slowly into and stored inside the bladder tank. As more water is added to the tank, the static water pressure inside the tank slowly goes up. When the water is used by the water using appliance the water pressure goes down and is ready to be increased slowly by the incoming water from the Reverse Osmosis unit.

The continuing description of the water supply system will be used with, for example, a commercial steam cooker device or a water-cooled ice-maker unit. It will be understood, however, that this system also may be associated with other similar types of water using equipment in which the use of low mineral water would be advantageous and there is a need for another kind of water for cooling or similar purpose.

The reverse osmosis unit is constructed with a feed water inlet 14, a potable product water outlet 16 and a waste water outlet 18. The reverse osmosis unit may be of the type described in U.S. Pat. No. 4,645,601 entitled Quick Change Reverse Osmosis Assembly issued Feb. 24, 1987.

In the water supply system the feed water first passes through filter(s) before reaching the reverse osmosis unit 10. The filters may include a particulate filter 20 for removing dirt, sand, rust and other large and fine particles from the feed water and in some cases a carbon filter 24 for removing chlorine.

In the reverse osmosis unit the water is split into two streams by the reverse osmosis membrane (not shown) embodied in the unit 10. The low mineral product water which passes through the reverse osmosis membrane flows through a product valve 26 and a check valve 28 and into storage tank 12. As the flow continues, pressure slowly builds up in the tank and this is sensed by a pressure sensor 30. When potable water is required by the equipment using the product water such as an ice-maker or steam cooker, water flows out of the tank 12 to the equipment.

The other water stream which does not pass through the reverse osmosis membrane, but rather flows by the membrane, so to speak, the waste water, flows from the outlet 18 through a flow control valve 32 and is split into two flow paths. One path 34 allows the flow of waste water through flow sensor 36 to the cooling water or condensing water inlet of the ice-maker or steam cooker (not shown). The other path 38 allows the flow of waste water through a waste valve 40 to a suitable drain 42. When the flow sensor 36 senses a flow to the equipment, the waste valve 40 is closed. When there is no flow through the flow sensor 36 (i.e., when the equipment being served does not require cooling or condensing water) the waste valve is opened.

FIG. 2 shows an electrical schematic for the described water supply system. The pressure sensor 30 typically may be set to open contacts at a storage tank pressure of approximately 20 psi, significantly lower than feed water pressure, and to close contacts 5 to 10 psi lower than the open contact setting. The flow sensor 36 is sensitive enough to detect the minimum cooling water flow rate for the equipment being served. The flow control valve 32 will be sized according to the product water output of the reverse osmosis unit and the feed water conditions.

While the operation of the water supply system should be apparent from the above description, several operating conditions are presented for additional explanation.

Condition 1

The storage tank 12 is full so that the pressure sensor 30 contacts are open. In this condition the product valve 26 is closed and the reverse osmosis process is stopped. No cooling or condensing water is being demanded by the equipment (steam cooker or ice-maker) so that no flow through the flow sensor causes the contacts to be closed. In this condition, because the pressure sensor contacts are open, the waste valve 40 is closed.

Condition 2

The storage tank 12 is full. Accordingly the pressure sensor contacts are open. The product valve 26 is closed and the reverse osmosis process is stopped. Now cooling water is demanded by the equipment so there is flow through the flow sensor 36 thus opening the flow sensor contacts. The waste valve 40 is closed.

Condition 3

The storage tank 12 is not full since the equipment has demanded and used water from the storage tank to make ice (in the case of an ice-maker) or steam (in the case of a steam cooker). The pressure in the tank 12 drops below the low end set point so that the contacts of pressure sensor 30 are closed. The product valve 26 is now open and the reverse osmosis process is operating to make low mineral water which is being added to the tank 12. At the same time, cooling water is being demanded by the equipment so that there is flow through the flow sensor 36 opening the flow sensor contacts and closing the waste valve 40.

Condition 4

The storage tank is not full so that the pressure sensor contacts are closed. In this condition the product valve 26 is open and the reverse osmosis process is operating. Cooling water is not being demanded by the equipment so there is no flow through the flow sensor 36 and accordingly the flow sensor contacts are closed. Since both the pressure sensor contacts and the flow sensor contacts are closed the waste valve 40 is open to accommodate disposal to drain of the waste water being used during the reverse osmosis process.

FIG. 3 illustrates generally the same water supply system as shown in FIG. 1 except that it is hydraulically operated. Here again the raw supply water passes through the particulate filter 20 which removes dirt, sand, rust and other large and fine particles from the water. The water then passes through the carbon filter 24 which removes any chlorine in the raw water. This carbon filter is used only if the reverse osmosis membrane used is susceptible to attack by chlorine. This treated water becomes the feed water for the R.O. module 10.

In this particular arrangement of FIG. 3, a pressure shutoff valve 50, which is a hydraulic shutoff valve, opens the waste line 38 to drain when the storage tank 12 is not full or closes the waste drain line when the storage tank is full and pressurized. This allows the waste water a path to drain when the equipment served is not requiring the waste water to be used as cooling water.

When the equipment requires cooling water, the waste water flows directly to the equipment and does not flow to the shutoff valve 50. This is accomplished by the pressure relief valve 52 which is set to open at a pressure slightly higher than that which is required to supply the cooling water to the equipment. When the equipment does not require cooling water, then the relief valve 52 opens and the waste water flows through it and through the shutoff valve 50, if it is kept open by the product water storage tank not being full and pressurized. When the equipment is not running and no water is required, if the storage tank is full, then the shutoff valve 50 closes and there is no waste flow.

Several operating conditions for the hydraulically operated system are described below for further explanation.

Condition 1

Water using equipment turned off, and no water is required. Reverse osmosis unit is not producing product water, because storage tank is full; pressure shutoff valve 50 is closed so there is no flow through the waste line to the waste drain.

Condition 2

The water using equipment is turned on using product and cooling waters. Feed water is flowing into the reverse osmosis module. In this condition the reverse osmosis unit is producing product water which flows into tank 12 and from the tank into the equipment. The waste drain shutoff valve 50 is open. However, the pressure relief valve 52 is closed allowing waste water to flow into the equipment cooling water connection.

Condition 3

The water using equipment is turned off, so no water is required, however, the storage tank 12 is not full thus needing product water to fill it. In this condition feed water is flowing through the reverse osmosis module, product water is flowing through the pressure shutoff valve 50 into the storage tank, and waste water flows through the open pressure relief valve 52 and the open shutoff valve (50) to waste drain.

Condition 4

The storage tank is full. The equipment is turned on requiring cooling water but not product water. The pressure shutoff valve is closed and waste water is flowing by the pressure relief valve to the equipment for cooling needs.

It will be apparent that we have provided a water supply system for use in both ice-making equipment and steam cookers and other equipment which will provide water of low mineral content by incorporating therein a reverse osmosis unit thus reducing scale formation in the equipment and contributing to easier maintenance. In addition more efficient use is made of the water by utilizing the waste water produced during the reverse osmosis process as cooling water in the same equipment in which the low mineral water is used.

While a preferred embodiment of the invention has been disclosed, it will be appreciated that this is shown by way of example only, and the invention is not to be limited thereto as other variations will be apparent to those skilled in the art and the invention is to be given its fullest possible interpretation within the terms of the following claims.

What is claimed is:

1. A water supply system for use in connection with certain water using equipment comprising:
   (a) a reverse osmosis unit having an inlet adapted to be connected to a feed water source, a potable product water outlet and a waste water outlet;
   (b) a storage tank for storing the potable product water received from the reverse osmosis unit;
   (c) first fluid communication means connecting said potable product water outlet of said reverse osmosis unit and said storage tank to convey product water from the reverse osmosis unit to the storage tank;
   (d) second fluid communication means connecting said storage tank and the water using equipment to convey product water from said tank to the water using equipment;
   (e) third fluid communication means connecting the waste water outlet of said reverse osmosis unit and a cooling water inlet of the water using equipment to convey waste cooling water to the water using equipment; (f) fourth fluid communication means connecting the waste water outlet of said reverse osmosis unit to a drain;
   (g) first fluid control means operatively associated with the water supply system for controlling the flow of product water to the stroage tank connected to the water using equipment; and
   (h) second fluid control means operatively associated with the water supply system for controlling the flow of waste water to drain or as cooling water to the water using equipment.

2. The water supply system of claim 1 wherein said first fluid control means includes a pressure sensor mechanism operatively associated with said storage tank for operating a product water valve.

3. The water supply system of claim 1 wherein said second fluid control means includes a flow sensor mechanism operatively associated with that portion of the water using equipment to be cooled and a shutoff valve controlling the flow of the waste water to drain.

4. The combination of claim 1 including filter means disposed upstream from said reverse osmosis unit to preliminarily filter inlet feed water before it reaches the reverse osmosis unit.

5. The combination of claim 4 wherein
said filter means includes a particulate filter for removing large and fine particles such as dirt or sand.

6. The combination of claim 4 wherein said filter means includes
a particulate filter for removing large and fine particles such as dirt or sand; and, a carbon filter for removing such elements as chlorine.

7. The combination of claim 1 wherein
said first fluid control means includes a hydraulically operated pressure shutoff valve operatively associated with said storage tank.

8. The combination of claim 1 wherein
said second fluid control means includes a pressure relief valve operatively associated with that portion of the water using equipment to be cooled.

9. The combination of claim 1 wherein
the water using equipment with which the water supply system is used is an ice maker device.

10. The combination of claim 1 wherein
the water using equipment with which the water supply system is used is a steam cooker device.

11. In a commercial ice-maker unit adapted to obtain its product water for making ice and its refrigerant cooling water from the same source, the combination comprising:
(a) a reverse osmosis unit having an inlet adapted to be connected to a feed water source, a potable product water outlet and a waste water outlet;
(b) A storage tank for storing the potable product water received from the reverse osmosis unit;
(c) first fluid communication means connecting said potable product water outlet of said reverse osmosis unit and said storage tank to convey product water from the reverse osmosis unit to the storage tank;
(d) second fluid communication means connecting said storage tank and the ice-maker unit to convey product water from said tank to the ice-maker unit;
(e) third fluid communication mean connecting the waste water outlet of said reverse osmosis unit and a cooling water inlet of the ice-maker unit to convey waste cooling water to the ice-maker unit;
(f) fourth fluid communication means connecting the waste water outlet of said reverse osmosis unit to a drain;
(g) first fluid control means operatively associated with the water supply system for controlling the flow of product water to the storage tank and/or the ice-maker unit to be used to make ice; and,
(h) second fluid control means operatively associated with the water supply system for controlling the flow of waste water either to drain or as cooling water to the ice-maker unit.

12. In a commercial steam cooker unit adapted to obtain its product water for making steam and its condensing water from the same source, the combination comprising:
(a) a reverse osmosis unit having an inlet adapted to be connected to a feed water source, a potable product water outlet and a waste water outlet;
(b) a storage tank for storing the potable product water received from the reverse osmosis unit;
(c) first fluid communication means connecting said potable product water outlet of said reverse osmosis unit and said storage tank to convey product water from the reverse osmosis unit ot the latter storage tank;
(d) second fluid communication means connecting said storage tank and the steam cooker unit to convey product water from said tank to the steam cooker unit;
(e) third fluid communication means connecting the waste water outlet of said reverse osmosis unit and a cooling water inlet of the steam cooker unit to convey waste cooling water to the steam cooker unit;
(f) fourth fluid communication means connecting the waste water outlet of said reverse osmosis unit to a drain;
(g) first fluid control means operatively associated with the water supply system for controlling the flow of product water to the storage tank and/or the steam cooker unit to be used to produce steam; and,
(h) second fluid control means operatively associated with the water supply system for controlling the flow of waste water either to drain or as condensing water to the steam cooker unit.

* * * * *